(No Model.)  J. C. CORWIN.  3 Sheets—Sheet 2.
CARGO TRIMMER.

No. 601,496.  Patented Mar. 29, 1898.

Witnesses.
E. C. Duffy
F. C. Barry

Inventor.
J. C. Corwin
per O. E. Duffy
Attorney.

(No Model.)  3 Sheets—Sheet 3.

J. C. CORWIN.
CARGO TRIMMER.

No. 601,496.  Patented Mar. 29, 1898.

Witnesses.  Inventor.
E. C. Duffy  J. C. Corwin
F. C. Barry  per C. C. Duffy
 Attorney.

UNITED STATES PATENT OFFICE.

JOHN C. CORWIN, OF TACOMA, WASHINGTON.

CARGO-TRIMMER.

SPECIFICATION forming part of Letters Patent No. 601,496, dated March 29, 1898.

Application filed October 1, 1897. Serial No. 653,742. (No model.)

*To all whom it may concern:*

Be it known that I, JOHN C. CORWIN, of Tacoma, in the county of Pierce and State of Washington, have invented certain new and useful Improvements in Cargo-Trimmers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in cargo-trimmers, and has for one of its objects simplicity, durability, and cheapness.

A further object of the invention is to provide a trimmer for vessels which can be easily and quickly put into operation and is always out of the way.

A further object is to provide a trimmer that will evenly distribute the cargo throughout the hold of a vessel while it is being loaded.

A further object is to provide flights of various designs suitable for different kinds of material with which the vessel is to be loaded.

The invention consists in certain novel features of construction and in combinations of parts more fully described hereinafter and particularly pointed out in the claims.

Figure 1:
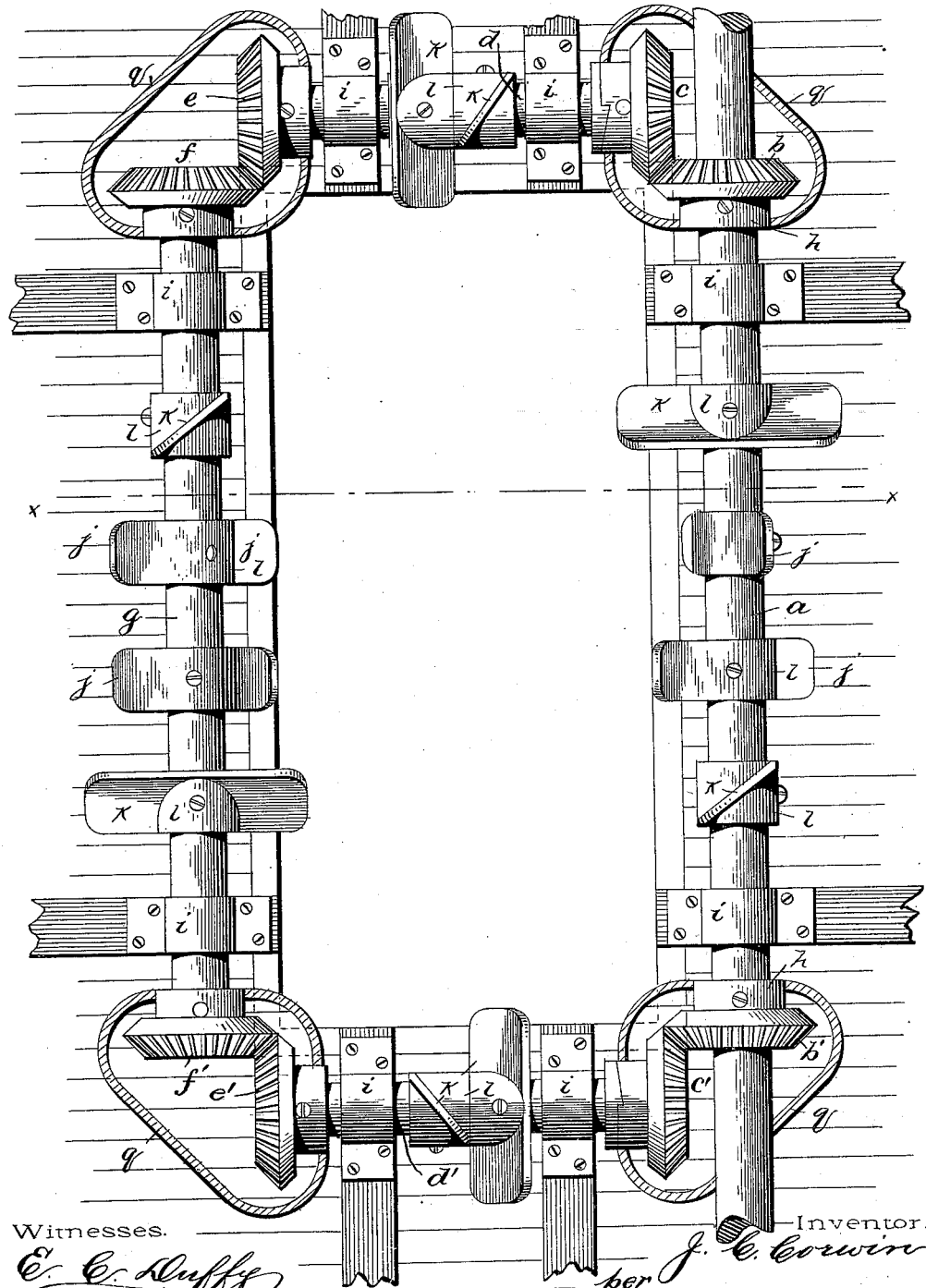
Figure 2:
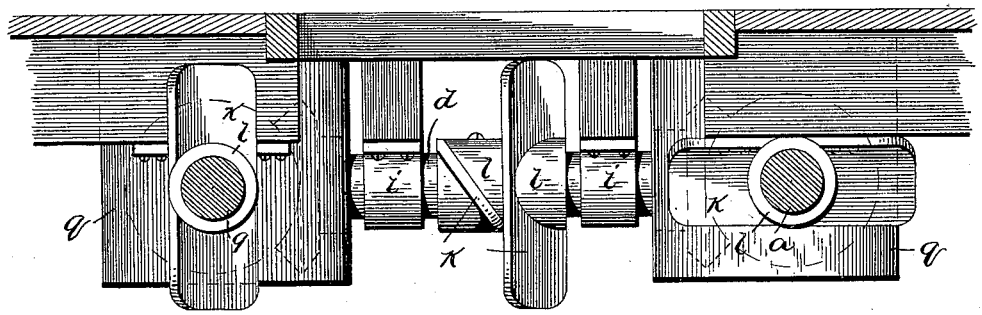
Figure 8:
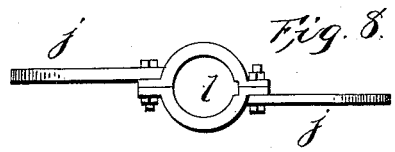
Figure 9:
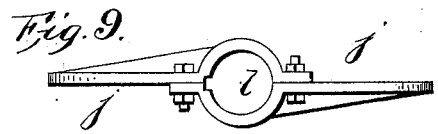
Figures 3, 4:
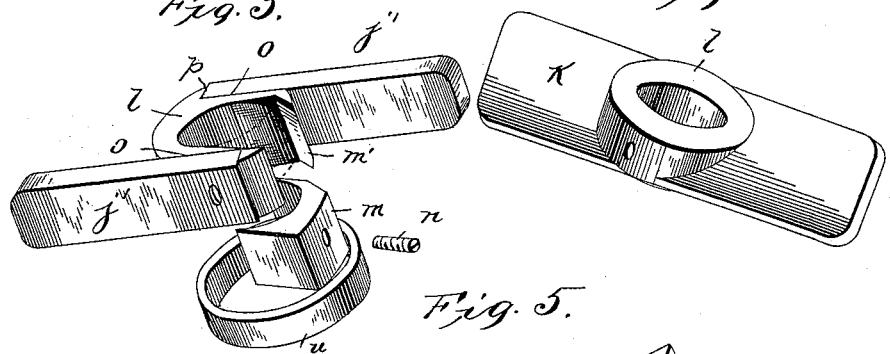
Figure 5:
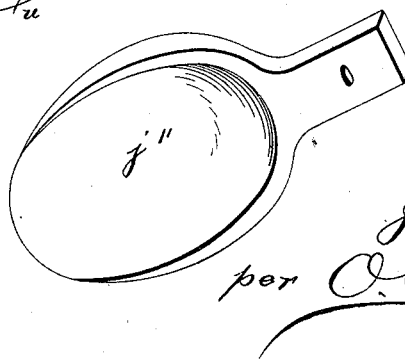
Figure 6:
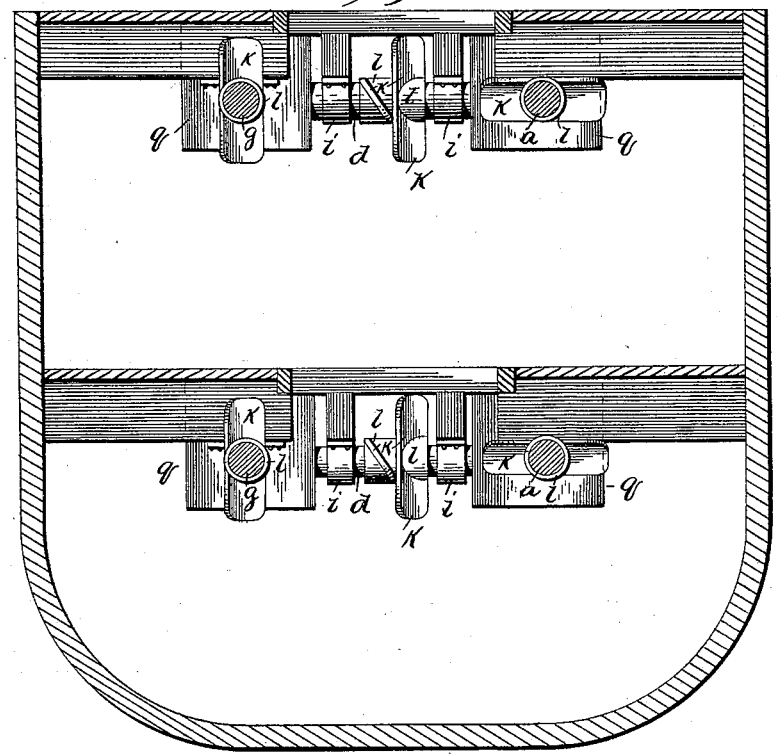
Figure 7:
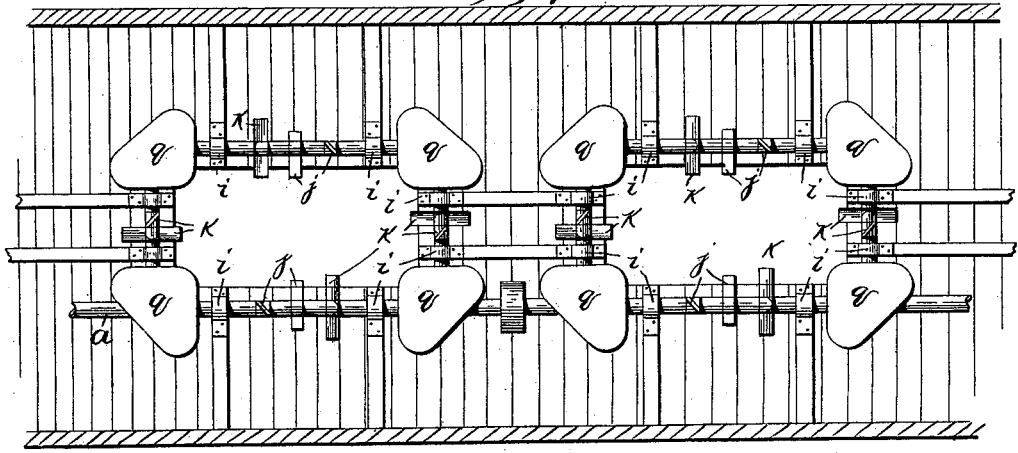

In the accompanying drawings, Figure 1 is an inverted plan view of the under side of the deck of a vessel, showing the trimmer arranged and set around the hatchway. Fig. 2 is a cross-section on the line $x\ x$, Fig. 1. Figs. 3, 4, and 5 are detail perspective views of various designs of flights detached. Fig. 6 is a cross-section of a vessel, showing a double deck and a trimmer arranged under and around the hatchway of each. Fig. 7 is an inverted plan view showing the drive-shaft operating the trimmers of two hatchways. Figs. 8 and 9 are detail views showing different modes of attaching the hubs and blade to the shafts.

Referring by letter to the drawings, $a$ is the main or drive shaft, secured to the under side of the deck of a vessel and extending longitudinally and horizontally the distance of the several hatchways thereof. This shaft is operated by any suitable motor or power-engine (not shown) and is provided with a belt-pulley.

$b\ b'$ are beveled gear-wheels carried by the shaft $a$ and are adapted to mesh with the beveled gears $c\ c'$, carried by the short shafts $d$ and $d'$, which are also provided with another set of gears $e\ e'$ at their other ends, engaging similar beveled gears $f f'$, carried by the shaft $g$, which runs parallel with the shaft $a$, but is only the length of each hatchway.

The shafts $a$, $d$, $d'$, and $g$ are arranged at right angles around the hatchway, as shown, the beveled gears all meshing and operating in unison.

The gears $b\ b'$ are provided with clutches $h$, of any suitable design, for the purpose of throwing the trimmer into and out of engagement with the main or drive shaft. This, however, may be done by any suitable and well-known means.

The shafts are secured in hangers placed around the hatchway and work in suitable bearings $i$, which are attached to the deck-timbers of the vessel.

$j$ are flights of various designs to suit the material being loaded and the different positions they occupy around the hatchway. The corner-flights $k$ are arranged at such an angle to the shaft as to distribute the material forming the cargo into the corners and storage-places of the hold of the vessel not filled by the straight shovels. It will be observed that the shovels or distributers may be changed to suit the material being loaded—such as grain, coal, or the like—and this can be readily done by the interchangeable character of the hubs carrying said blades. These flights $j\ k$ are detachably secured to a hub $l$, which is removably and adjustably secured to the shafts $a$, $d$, $d'$, and $g$ by means of the block $m$, which is slightly larger than the shafts and is adapted to fit snugly in the way $m'$ in the hub $l$.

$n$ is a set-screw or key which is passed through the block $m$ and into the shaft, securing the hub against lateral and rotating motion on the shaft.

$u$ is a band placed around the hub $l$ to keep it from spreading when the key is inserted. The hubs $l$ are also provided with a recess or cut-away portion o, having an abutment p, against which the edge of the flight j rests when secured in said recess o by means of a screw or other suitable fastening.

It is well known that the act of loading a vessel with any dry material creates a quantity of dust, which is damaging to all classes of machinery, so I arrange a casing or housing q around the gear-wheels at each corner of the hatchway in such a manner as to protect them from dust. The shafts will pass through them and freely revolve without hindrance In operation the device is very simple and effective and is as follows: The shafts a, d, d', and g are arranged at right angles to each other around the hatchway a suitable distance below the deck and secured by hangers in bearings carried by the timbers of the vessel. The main driving-shaft a extends the length of the several hatchways of the vessel and is provided with a set of gear-wheels b b' for each hatchway, meshing with gears c c' of the shafts d d', which in turn mesh with the beveled gears e e' of the shaft g, which is parallel with the main driving-shaft a on the opposite side of the hatchway, thus completely framing the hatchway with revolving shafts, which may be operated by any suitable power through and by means of the drive-shaft a, the drive-shaft operating all of the hatchway-gearing. These shafts are all provided with flights j and k and j' and j'', Figs. 3 and 5, which are adjustably secured to the shaft by means of the hubs, as has been before described. Suitable housings q are provided to inclose the meshing beveled gears to protect them from dust, dirt, &c., the shafts passing through said housing and not interrupted in their action.

It will be observed that when the driving-shaft is in operation all the flights, by their peculiar mounting on the several shafts and the arrangement of the beveled gearing, revolve at the same time to throw the grain away from the mouth of the hatchway in opposite directions to the several quarters of the storage-places of the vessel, and thus the material loaded is evenly distributed at the same time and as fast as it is fed to the hold.

Of course if the vessel is to be loaded with different material any of the sets of flights may be disconnected while the others are in motion and one material loaded in one side of the vessel and a different material in the other side by again connecting the flights. In any case the cargo is distributed evenly and the vessel trimmed in the manner described.

When found necessary to trim vessels having double decks, a duplicate set of flights may be employed and arranged as those under the main deck.

Clutches or other well-known shifting devices (not shown) may be employed to throw the working parts in and out of gear, as may be required. The flights may be made of any desired width, length, or angle to suit the various kinds of material to be loaded and of suitable metal.

It is evident that various slight changes might be made in the forms, construction, and arrangements of the parts described without departing from the spirit and scope of my invention. Hence I do not wish to limit myself to the exact construction herein set forth, but consider myself entitled to all such changes as fall within the spirit of my invention.

Having thus fully described my invention, what I claim, and desire to secure by Letters Patent of the United States, is—

1. A cargo-trimmer for vessels comprising driven shafts, a main drive-shaft, the said shafts having gear-wheels meshing with each other, and flights mounted on the said shafts, and arranged to be revolved by them, substantially as described.

2. In a cargo-trimmer, the combination of the shafts arranged around the hatchway of a vessel with gear-wheels mounted on said shafts meshing with each other, and adapted to revolve in unison, one of the said shafts being the drive-shaft and extending longitudinally of the vessel, flights carried by said shafts and adapted to distribute material being loaded evenly throughout the hold, substantially as set forth.

3. A trimmer for vessels comprising the main drive-shaft, gear-wheels on said shaft, short shafts at right angles to said drive-shaft, gear-wheels thereon meshing with those of the drive-shaft, a shaft running parallel with said drive-shaft on the opposite side of the hatchway, gears thereon meshing with the gear-wheels of said short shafts and flights on said shafts all revolving in unison so as to throw the material away from the center of the hatchway, substantially as described.

4. A trimmer for vessels comprising the main drive-shaft, gear-wheels on said shaft, short shafts at right angles to said drive-shaft, gear-wheels thereon meshing with those of the drive-shaft, a shaft running parallel with said drive-shaft on the opposite side of the hatchway, gears thereon meshing with the gear-wheels of said short shafts, housings or casings for said gear-wheels and flights on said shafts operated from the main drive-shaft, substantially as and for the purpose set forth.

5. In a trimmer for vessels the combination of the flights surrounding the hatchways, shafts carrying said flights, gear-wheels on said shafts, a main drive-shaft operating said flights by means of the gear-wheels simultaneously and in the manner described and housings for said gear-wheels, for the purpose set forth.

6. A trimming-machine consisting of a series of shafts arranged around a hatchway the bevel gear-wheels adapted to be operated by the main or drive shaft, and flights mounted on said shaft and arranged at such angle in respect to the loading that the cargo is distributed to the storage-place of the vessel in the said manner and for the purpose described.

7. A trimmer for distributing a cargo in a ship's hold, consisting of a drive-shaft and auxiliary shafts arranged around the hatchway, each shaft carrying connecting and meshing gear-wheels, distributing-flights, said flights being adjustable removable and detachable from said shafts without displacing the shafts substantially as set forth.

In testimony that I claim the foregoing as my own I affix my signature in presence of two witnesses.

JOHN C. CORWIN.

Witnesses:
F. P. HASKELL, Jr.,
GEO. E. DIXON.